(12) United States Patent
Keen et al.

(10) Patent No.: US 11,010,700 B2
(45) Date of Patent: May 18, 2021

(54) IDENTIFYING TASK AND PERSONALITY TRAITS

(71) Applicant: International Business Machines Corporation, Armonk, NY (US)

(72) Inventors: Martin G. Keen, Cary, NC (US); Adam J. Smye-Rumsby, Reading, PA (US)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 15/604,013

(22) Filed: May 24, 2017

(65) Prior Publication Data
US 2018/0341903 A1   Nov. 29, 2018

(51) Int. Cl.
*G06Q 10/06* (2012.01)
*G06N 20/00* (2019.01)
*G06N 5/02* (2006.01)

(52) U.S. Cl.
CPC ..... *G06Q 10/063118* (2013.01); *G06N 5/022* (2013.01); *G06N 20/00* (2019.01); *G06Q 10/063114* (2013.01)

(58) Field of Classification Search
CPC ..... G06Q 10/063118; G06Q 10/06311; G06Q 10/0631; G06Q 10/063116; G06Q 10/06313; G06Q 10/06315
See application file for complete search history.

(56) References Cited

U.S. PATENT DOCUMENTS

| 7,596,416 B1 | 9/2009 | Maluf et al. |
| 8,317,520 B2 | 11/2012 | Swanson |
| 9,741,259 B2 * | 8/2017 | Mahmud ................. G09B 7/00 |
| 2007/0162316 A1 | 7/2007 | Kratschmer et al. |

(Continued)

FOREIGN PATENT DOCUMENTS

WO   WO-2016005913 A1 *  1/2016  ........... G06K 9/6201

OTHER PUBLICATIONS

Roth, Philip, Bobko, Philip, Iddekinge, Chad, Thatcher, Jason, Social Media in Employee-Selection-Related Decisions: A research agenda for Uncharted Territory, 2013, Journal of Management, all pages (Year: 2013).*

(Continued)

*Primary Examiner* — Hafiz A Kassim
*Assistant Examiner* — Zahra Elkassabgi
(74) *Attorney, Agent, or Firm* — Jared C. Chaney

(57) ABSTRACT

The present invention provides a method, a system, and a computer program product of determining tasks of a project and determining personality traits of the tasks. In an embodiment, the method, the system, and the computer program product include in response to receiving a set of data for a current project, generating, by one or more processors, a set of one or more current tasks for the current project based on at least a first machine learning associated with one or more preexisting projects, generating a set of one or more personality traits for a current task in the set of one or more current tasks based on at least a second machine learning associated with one or more preexisting tasks, and compiling the set of one or more current tasks and the set of one or more personality traits into one or more current task profiles.

17 Claims, 9 Drawing Sheets

(56) References Cited

U.S. PATENT DOCUMENTS

| | | | |
|---|---|---|---|
| 2010/0169134 A1* | 7/2010 | Cheng | G06Q 10/06398 |
| | | | 705/7.42 |
| 2010/0279267 A1* | 11/2010 | Swanson | G09B 7/00 |
| | | | 434/362 |
| 2011/0244953 A1 | 10/2011 | Pekau et al. | |
| 2013/0297543 A1* | 11/2013 | Treiser | G06Q 30/02 |
| | | | 706/45 |
| 2015/0310344 A1* | 10/2015 | Gunjan | G06Q 10/0639 |
| | | | 706/52 |
| 2016/0292644 A1 | 10/2016 | Drakoulis | |
| 2017/0193349 A1* | 7/2017 | Jothilingam | G06N 20/10 |

OTHER PUBLICATIONS

IBM, "Personality models," Watson Developer Cloud, IBM, printed on Mar. 7, 2017, © 2017 IBM, 3 pages http://www.ibm.com/smarterplanet/us/en/ibmwatson/developercloud/doc/personality-insights/models.shtml.

Mell et al., "The NIST Definition of Cloud Computing: Recommendations of the National Institute of Standards and Technology," US Department of Commerce, Special Publication 800-145, Sep. 2011, 7 pages.

\* cited by examiner

IDENTIFYING TASK AND PERSONALITY TRAITS

BACKGROUND

The present invention relates to task assignment, and more specifically, identifying task and personality traits using one or more processors.

Recent research has been directed to developing cognitive computing systems (e.g., concept expansion systems, question answering systems, etc.) that utilize deep neural networks, convolution deep neural networks, deep belief networks, and recurrent neural networks that may be applied to computer vision, automatic speech recognition, natural language processing, and bioinformatics. Cognitive computing systems may build knowledge and learn (e.g., via training), understand natural language, reason, quickly identify new patterns, put content in context with confidence scores, analyze terms and interpret the terms' meanings, all of which may ultimately model intelligence.

SUMMARY

Embodiments of the present invention may be directed toward a method, a system, and a computer program product of identifying task and personality traits using one or more processors. In an exemplary embodiment, the method, the system, and the computer program product include (1) in response to receiving a set of data for a current project, generating, by one or more processors, a set of one or more current tasks for the current project based on at least a first machine learning associated with one or more preexisting projects, (2) generating, by the one or more processors, a set of one or more personality traits for a current task in the set of one or more current tasks based on at least a second machine learning associated with one or more preexisting tasks, and (3) compiling the set of one or more current tasks and the set of one or more personality traits into one or more current task profiles. In an embodiment, the first machine learning includes identifying patterns and associations between the one or more preexisting projects and one or more preexisting tasks of the one or more preexisting projects. In an embodiment, the second machine learning includes identifying patterns and associations between the one or more preexisting tasks and one or more preexisting personality traits of the one or more preexisting tasks.

DETAILED DESCRIPTION

Figure 1:
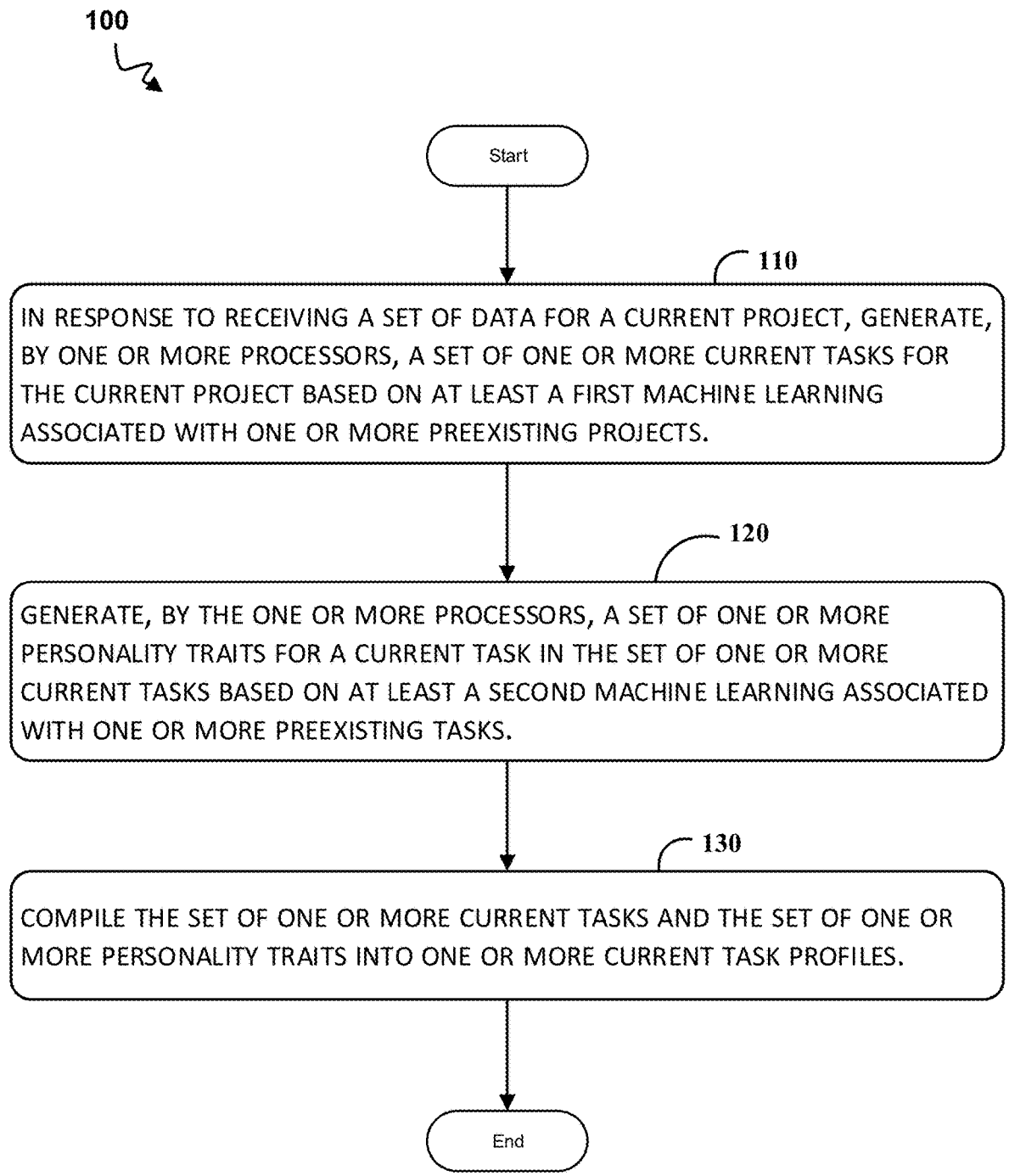
FIG. 1 depicts a flow chart, in accordance with an exemplary embodiment of the present invention.

The present invention provides a method, a system, and a computer program product of identifying task and personality traits using one or more processors. In an exemplary embodiment, the method, the system, and the computer program product include (1) in response to receiving a set of data for a current project, generating, by one or more processors, a set of one or more current tasks for the current project based on at least a first machine learning associated with one or more preexisting projects, (2) generating, by the one or more processors, a set of one or more personality traits for a current task in the set of one or more current tasks based on at least a second machine learning associated with one or more preexisting tasks, and (3) compiling the set of one or more current tasks and the set of one or more personality traits into one or more current task profiles. In an embodiment, the first machine learning includes identifying patterns and associations between the one or more preexisting projects and one or more preexisting tasks of the one or more preexisting projects. In an embodiment, the preexisting tasks in the first machine learning and the preexisting tasks in the second machine learning are the same preexisting tasks. In an embodiment, the preexisting tasks in the first machine learning and the preexisting tasks in the second machine learning are different preexisting tasks. In an embodiment, the second machine learning includes identifying patterns and associations between the one or more preexisting tasks and one or more preexisting personality traits of the one or more preexisting tasks.

Cognitive Language analysis and Machine Learning

In an embodiment, a cognitive language analysis module analyzes a mixture of formal and informal sources, and uses cognitive language techniques to draw out specific requirements. For example, the following cognitive analytic techniques could be used alone or in conjunction with others: natural language processing (NLP), relationship extraction, tone analyzer, and speech to text. NLP is the analysis of unstructured text to identify when specific project tasks are mentioned in text and to extract the requirements from the unstructured text. Relationship extraction is the performance of linguistic analysis by assigning text entities (such as people, locations, events, and organizations), and establishing relationships between these text entities. The tone analyzer analyzes the emotion portrayed in text. Speech to text converts the human voice into the written word. For example, speech to text services could transcribe conversations held at a meeting and NLP, relationship extraction, and tone analyzer services could analyze the transcription.

Aspects of the present disclosure relate to cognitive language analysis systems, and more specifically, to identifying tasks and preferred personality traits for a project using an NLP system. While the present disclosure is not necessarily limited to such applications, various aspects of the disclosure could be appreciated through a discussion of various examples using this context. Thus, in an embodiment, any other cognitive language analysis system (such as relationship extraction, tone analyzer, and speech to text)

could be used in conjunction with or in place of NLP. In one embodiment, a NLP system is one or more processors. In one embodiment, one or more processors is an NLP system.

Some NLP systems process around 500 gigabytes (the equivalent of a million books) per second. In an embodiment, sources of information in an NLP system information corpus includes: encyclopedias, dictionaries, thesauri, newspaper articles, literary works, scientific journals, social media posts, blogs, etc.

Machine learning paradigms, cognitive data/information processing, pattern classification or pattern recognition, regression methods, artificial or computational intelligence, data mining, statistical data analysis, computational learning, and cognitive machines, etc., are methods capable of sorting objects into classes. These algorithms extract features or attributes from a data source and use them for classification. For example, an aspect of various machine learning procedures is the acquisition of training data, which could include the use of supervised, unsupervised, or hybrid learning techniques. For example, the predictive models could include appropriate supervised learning algorithms (such as regression models, artificial neural networks, and support vector machines) and statistical classifiers, trained on data from the knowledge base, which can include objects presented to the classifier whose classes are known. Using predictive models enables the classifier to then identify the characteristics, models, and clusters according to class (e.g., by finding the cluster which most closely corresponds to the features extracted from the object). As a particular example, an AI engine could be configured to use NLP to identify one or more tasks for a project. The one or more tasks could then be used and applied to data sourced from social media or elsewhere online to identify personality traits which are required or beneficial to the completion of the one or more tasks.

Selecting Tasks and Assigning Personnel

Selecting tasks for a project is a difficult and time consuming endeavor. For example, it takes time for a human to sift through all project data and derive tasks for the project from the data. In some cases, it is not logistically possible for a human to go through each database containing project information in order to discern every requirement of a project and create tasks to meet all requirements.

Assignment of tasks within a team is an important aspect of project management that can directly influence the success of a project. Typically, skill matching plays a major role in selecting which team member will work on which task for any given project. While possessing the technical skills to complete a task is undoubtedly important, matching the personality traits of a team member to the personality traits required to complete a task should also be considered. For example, a high-profile task with a tight deadline could require a personality type that performs well under stress. Similarly, a task that requires working closely with another team requires a personality type that collaborates well with others. A particular difficulty, however, may arise when two or more team members possess the necessary expertise for performing a given task. For example, two team members could have the necessary language and technical skills to complete a task of writing a chapter of a book. Resources must be spent researching each candidate and determining which of the two or more qualified candidates would be better equipped to complete the task. It could be difficult for a human to sift through the data on the tasks to determine what personality traits are important for each task.

Consider the example scenario where four team members will co-author a book. Each team member is responsible for the task of writing one chapter of the book. While each chapter requires a different skill set, many team members could possess the required skill set. Therefore, skill alone is not always the determining factor in deciding which team member should complete which task. The present invention talks to assigning one or more tasks based on personality traits associated with the one or more tasks.

Referring to FIG. 1, in an exemplary embodiment, the present invention is configured to perform an operation 110 of in response to receiving a set of data for a current project, generating, by one or more processors, a set of one or more current tasks for the current project based on at least a first machine learning associated with one or more preexisting projects, an operation 120 of generating, by the one or more processors, a set of one or more personality traits for a current task in the set of one or more current tasks based on at least a second machine learning associated with one or more preexisting tasks, and an operation 130 of, compiling the set of one or more current tasks and the set of one or more personality traits into one or more current task profiles. In an embodiment, the set of data for the current project describes at least one of a statement of work, one or more documents of understanding, one or more requirements documents, one or more project plans, one or more emails, one or more instant messages, and one or more conversations. For example, conversations could be recorded from meetings, phone calls, or seminars.

Natural Language Processing to Determine Tasks and Personality Traits

Figure 2:
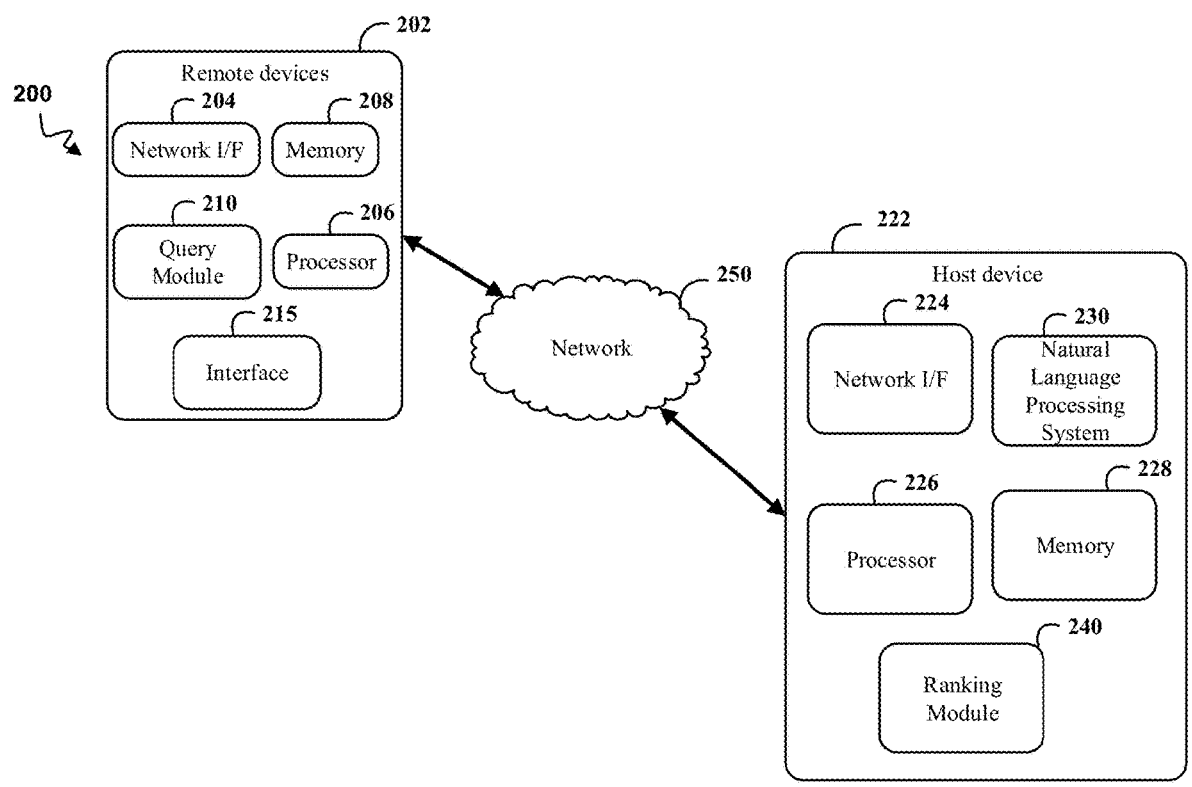
FIG. 2 is a block diagram of an example natural language processing (NLP) system, according to embodiments.

FIG. 2 is a block diagram of an example computing environment 200, consistent with an embodiment of the present disclosure. In an embodiment, computing environment 200 includes one or more remote devices 202 (e.g., client computing devices) and one or more host devices 222 (e.g., NLP systems). In an embodiment, remote device 202 and host device 222 are distant from each other and communicate over a network 250 in which host device 222 includes a central hub from which remote device 202 can establish a communication connection. In an embodiment, host device 222 and remote device 202 are configured in any other suitable relationship (e.g., in a peer-to-peer or other relationship).

In an embodiment, network 250 is implemented by any number of any suitable communications media (e.g., wide area network (WAN), local area network (LAN), internet, intranet, etc.). In an alternative embodiment, remote device 202 and host device 222 are local to each other, and communicate via any appropriate local communication medium (e.g., LAN, hardwire, wireless link, intranet, etc.). In an embodiment, one or more cloud computing services implement network 250 within a cloud computing environment. In an embodiment, a cloud computing environment includes a network-based, distributed data processing system that provides one or more cloud computing services. In a further embodiment, the cloud computing environment includes many computers disposed within one or more data centers and configured to share resources over network 250.

In an embodiment, host device 222 includes an NLP system 230. As described herein, an "NLP system" is one or more computing devices that performs NLP associated with natural language input (e.g., text associated with a user query) and/or NLP associated with data store content (e.g., text within an information corpus). In an embodiment, NLP is the ability of a computing device(s) to process, understand, analyze, and/or generate human speech in one or more forms (e.g., speech recognition for auditory speech, understanding written speech via syntactic analysis, etc.). In an embodiment, the method includes ranking, by the one or more processors, one or more members of the set of one or more personality traits. Host device 222 further includes a memory 228 and a personality trait ranking module 240. In an embodiment, personality trait ranking module 240 is computer-readable program instructions that are stored within memory 228 configured to identify, score, and rank one or more personality traits (e.g., agreeableness, conscientiousness, extraversion, emotional range, and openness) based on the degree of correlation, as described in more detail below. In an embodiment, ranking module 240 is part of NLP system 230. In an embodiment, the method includes ranking, ranking module 240, one or more members of the set of one or more personality traits based on the generating.

In an embodiment, remote device 202 enables users to transmit information (e.g., project needs and requirements) to host device 222 to retrieve one or more tasks for the project or one or more personality traits for a task. For example, remote device 202 could include a query module 210 (e.g., in the form of a web browser or any other suitable software module) and present a graphical user interface (GUI) or other interface (e.g., command line prompts, menu screens, etc.) to solicit queries from users for submission to one or more host devices 222 and to display answers/results obtained from host devices 222 in relation to such user queries. For example, tasks could be preexisting from previous projects or new tasks generated by host device 222. In an embodiment, remote device 202 prompts users for additional information to further narrow down the task selection. For example, if host device 222 receives data stating "first write the chapter, then edit the chapter" remote device 202 could query users for information regarding the subject of each chapter. After receiving the information, host device 222 could generate appropriate tasks based on the totality of data.

In an embodiment, host device 222 and remote device 202 are computer systems, and are each equipped with a display or monitor. The computer systems also include at least one of a processor 206, a processor 226, a memory 208, a memory 228, an user interface 215, an internal or external network interface or a communications device 204 (e.g., modem, network cards, etc.), internal or an external network interface 224, an optional input devices (e.g., a keyboard, mouse, or other input device), and any commercially available or custom software (e.g., browser software, communications software, server software, NLP software, search engine and/or web crawling software, filter modules for filtering content based upon predefined criteria, etc.). In an embodiment, the computer systems include servers, desktops, laptops, and hand-held devices (e.g., mobile phones, touch pads, smart watches, etc.).

Figure 3:
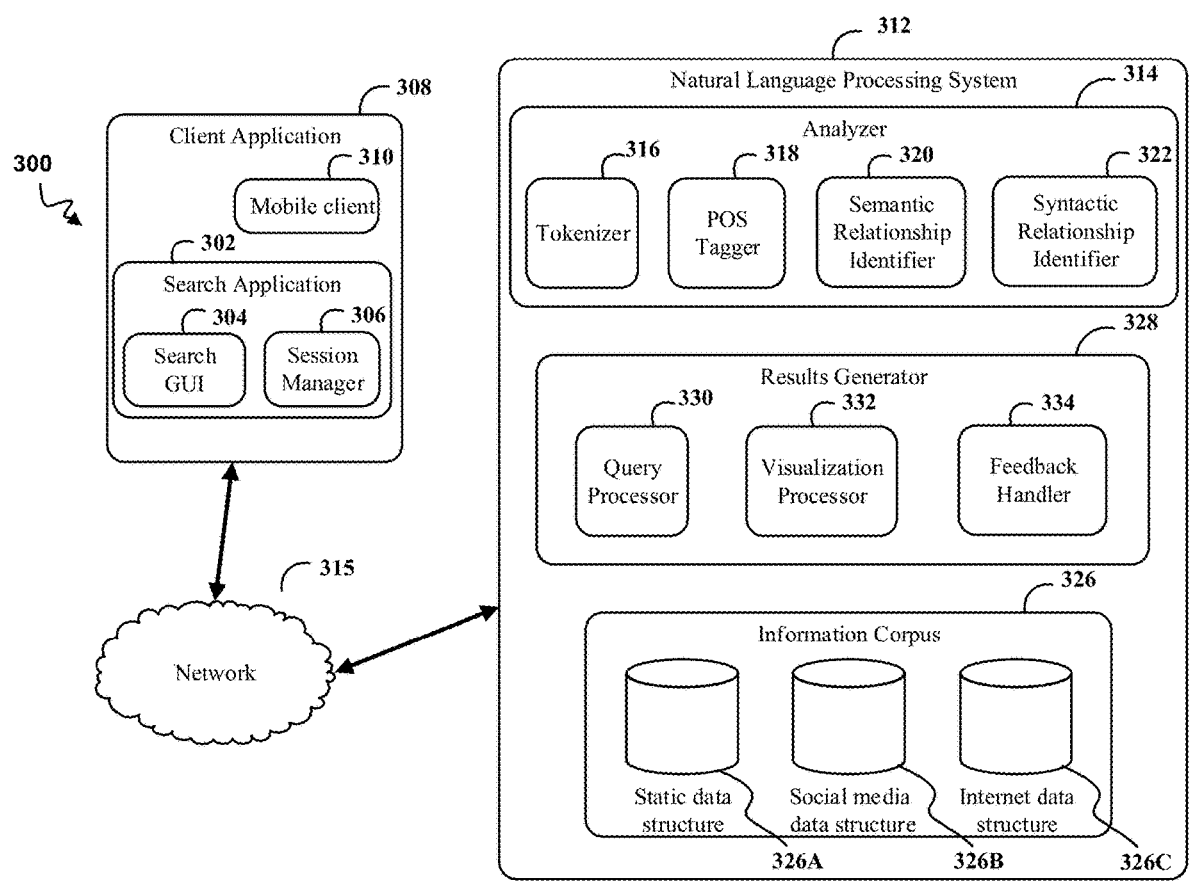
FIG. 3 is a block diagram of an example NLP system, according to embodiments.

In an embodiment, FIG. 3 is a block diagram of an example NLP system 312 located within a computing environment 300. In an embodiment, NLP system 312 is configured for identifying one or more tasks based on project data. In an embodiment, NLP system 312 is configured for identifying one or more personality traits based on task data. In an embodiment, one or more users can send requests for information to NLP system 312 using a remote device (such as remote device 202). For example, such a remote device could include a client application 308 which could itself involve one or more entities operable to generate information that the remote device dispatches to NLP system 312 via network 315. In an embodiment, NLP system 312 is able to perform methods and techniques for responding to the requests sent by a client application 308. In an embodiment, the information received at NLP system 312 corresponds to input project information/data received from users, where the input is expressed in free form and in natural language.

In an embodiment, a query or input (e.g., project requirement, tasks, or personality traits) is one or more words that form a search term or request for data, information, or knowledge. In an embodiment, the input is expressed in the form of one or more keywords. In an embodiment, input includes various selection criteria and search terms. For example, an input could be composed of complex linguistic features in addition to keywords (e.g., acronyms). In an embodiment, a keyword-based search for answers to the inputs could also be possible. In an embodiment, using restricted syntax for questions posed by users is enabled. The use of restricted syntax results in a variety of alternative expressions that assist users in better stating their needs.

In an embodiment, client application 308 operates on a variety of devices. Such devices include, but are not limited to, mobile and handheld devices (e.g., laptops, mobile phones, personal or enterprise digital assistants, and the like), personal computers, servers, or other computer systems that access the services and functionality provided by NLP system 312. In an embodiment, client application 308 includes one or more components, such as a mobile client 310. In an embodiment, mobile client 310, acting as an agent of client application 308, dispatches user query requests to NLP system 312.

In an embodiment, client application 308 also includes a search application 302, either as part of mobile client 310 or separately. Search application 302 performs several functions, including some or all of the functions of mobile client 310 listed above. For example, search application 302 dispatches requests for information, such as a particular task, to NLP system 312. In an embodiment, search application 302 is a client application to NLP system 312. Search application 302 sends requests for candidate results to NLP system 312. Search application 302 is installed on a personal computer, a server, or other computer system.

In an embodiment, search application 302 includes a search GUI 304 and a session manager 306. In such situations, users enter input terms in search GUI 304. In an embodiment, search GUI 304 is a search box or other GUI component, the content of which represents input to be submitted to NLP system 312. In an embodiment, users authenticate to NLP system 312 via session manager 306. In an embodiment, session manager 306 keeps track of user activity across sessions of interaction with NLP system 312. In an embodiment, session manager 306 also keeps track of what inputs (e.g., data sources) a user submits within the lifecycle of a session of the user. For example, session manager 306 could retain the data sources across several sessions (e.g., "email servers, project files, etc."). In an embodiment, NLP system 312 produces preexisting tasks, new tasks, preexisting personality traits, and/or new personality traits in response to a user input. In an embodiment, information for sessions managed by session manager 306 is shared between computer systems and devices.

In an embodiment, client application 308 and NLP system 312 are communicatively coupled through network 315 (e.g., the internet, intranet, or other public or private computer network). In an embodiment, NLP system 312 and client application 308 communicate by using hypertext transfer protocol (HTTP), representational state transfer (REST) calls, or any other suitable protocol. In an embodiment, NLP system 312 resides on a server node. Client application 308 establishes server-client communication with NLP system 312 or vice versa. In an embodiment, network 315 is implemented within a cloud computing environment, or using one or more cloud computing services.

In an embodiment, consistent with various other embodiments, NLP system 312 responds to the requests for information sent by client application 308 (e.g., a particular project requirement). In an embodiment, NLP system 312 then obtains a set of one or more projects with the same or similar requirements and one or more tasks derived from the one or more projects. In an embodiment, NLP system 312 then obtains a set of one or more tasks with the same or similar requirements and personality traits derived from the one or more tasks. The one or more tasks derived from the set of one or more projects do not have to be the same tasks as the set of tasks with the same or similar requirements and personality traits derived from the tasks. In an embodiment, NLP system 312 includes an analyzer 314, an information corpus 326, and a result generator 328. The analyzer 314 is a computer module (e.g., NLP module) that analyzes the received input. Analyzer 314 performs various methods and techniques for analyzing structured data (e.g., data from databases), unstructured data (e.g., data from a web page), and/or multimedia (e.g., images, audio, video, etc.). For example, analyzer 314 utilize syntactic analysis and semantic analysis, as described below.

In an embodiment, analyzer 314 parses passages of documents, such as downloaded project data sheets. In an embodiment, analyzer 314 includes various modules to perform analyses of received inputs. For example, analyzer 314 could include, but is not limited to computer modules: a tokenizer 316, a part-of-speech (POS) tagger 318, a semantic relationship identifier 320, and a syntactic relationship identifier 322.

In an embodiment, tokenizer 316 is a computer module that performs lexical analysis. Tokenizer 316 converts a sequence of characters into a sequence of tokens. For example, a token is a string of characters included in an electronic document (e.g., a requirements document or statement of work) and categorized as a meaningful symbol. Further, in an embodiment, tokenizer 316 identifies word boundaries in an electronic document and breaks or parses any text passages within the document into component text elements, such as words, multiword tokens, numbers, and punctuation marks. In an embodiment, tokenizer 316 receives a string of characters, identifies the lexemes in the string, and categorizes them into tokens. In an example illustration, in order for NLP system 312 to generate a task profile with one or more personality traits, tokenizer 316 could first parse one or more pages of data for a project into a specific list of requirements, and tokenizer 316 could then divide those requirements into different tasks in order to determine the allocation of requirements to each task.

In an embodiment, POS tagger 318 is a computer module that marks up a word in passages to correspond to a particular part of speech. POS tagger 318 reads a passage or other text in natural language and assigns a part of speech to each word or other token. POS tagger 318 determines the part of speech to which a word (or other text element) corresponds based on the definition of the word and the context of the word. In an embodiment, the context of a word is based on its relationship with adjacent and related words in a phrase, sentence, question, or paragraph. In an embodiment, the context of a word could be dependent on one or more previously analyzed electronic documents (e.g., the content of one source document sheds light on the meaning of text elements in another source document). Examples of parts of speech that could be assigned to words include, but are not limited to, nouns, verbs, adjectives, adverbs, and the like. Examples of other part of speech categories that POS tagger 318 could assign include, but are not limited to, comparative or superlative adverbs, wh-adverbs, conjunctions, determiners, negative particles, possessive markers, prepositions, wh-pronouns, and the like. In an embodiment, POS tagger 318 could tag or otherwise annotate tokens of a passage with part of speech categories. In an embodiment, POS tagger 318 tags tokens or words of a passage to be parsed by NLP system 312.

In an embodiment, semantic relationship identifier 320 is a computer module that identifies semantic relationships and/or domains of recognized text elements (e.g., words, phrases) in documents. For example, words or phrases that share a same semantic class could share one or more attributes associated with a broader category. In an embodiment, semantic relationship identifier 320 determines functional dependencies between entities and other semantic relationships. For example, if NLP system 312 obtains a project with the requirements; authoring a chapter of a book and advertising the book, semantic relationship identifier 320 could group the authoring into a writing type of class and the advertising into a marketing type of class. In an embodiment, grouping into particular classes is useful for NLP system 312 to utilize ontologies in order to find candidate tasks or personality traits of those tasks. An "ontology" is a particular conceptualization of a symbol (e.g., phrase, acronym, etc.) that represents something. In an embodiment, an ontology describes what a symbol represents as opposed to what a symbol means such that an entity understands the definition by a well-described or understood symbol. In an embodiment, ontologies include one or more axioms (i.e., a rule or statement that people generally regard as true) to better reflect a meaning of a symbol. In an embodiment, NLP system 312 utilizes ontologies by mapping a particular set of tasks to a task class. For example, if a project has the requirement that conflicting opinions could be used to write different chapters of a book, NLP system 312 could first search, via semantic relationship identifier 320, the particular class to which the term "conflicting" belongs to (i.e., subject matter) and identify candidate tasks for the current project within the class by mapping iterations of the term "conflicting" in that class.

In an embodiment, syntactic relationship identifier 322 is a computer module that identifies syntactic relationships in a passage composed of tokens. Syntactic relationship identifier 322 determines the grammatical structure of sentences. For example, which groups of words are associated as phrases and which words are the subject or object of a verb. Syntactic relationship identifier 322 conforms to formal grammar. For example, within a project requirement document, syntactic relationship identifier 322 determines the difference between preparing steps, writing steps, and marketing steps.

In an embodiment, analyzer 314 is a computer module that can parse a received user query and generate a corresponding data structure of the user query. For example, in response to receiving an input at NLP system 312, analyzer 314 could output a parsed project or task as a data structure. In an embodiment, a parse tree or other graph structure represents the parsed output. To generate the parsed output, analyzer 314 triggers computer modules 316, 318, 320, and 322. Additionally, in an embodiment, analyzer 314 uses external computer systems for dedicated tasks that are part of the parsing process. In an embodiment, analyzer 314 and/or result generator 328 are program modules located within a memory (such as memory 228).

In an embodiment, result generator 328 is a computer module that generates new tasks and personality traits or obtains preexisting tasks and preexisting personality traits. Examples of tasks and personality traits generated by result generator 328 could include, but are not limited to, responses in the form of natural language sentences, reports, charts, other analytic representation, raw data, web pages, and the like.

In an embodiment, search application 302 uses the output of analyzer 314 to perform a search of a set of corpora to retrieve one or more traits in response to an input (e.g., project requirements). In an embodiment, a corpus refers to one or more data sources. In an example illustration, if a project has a requirement to write a chapter of a book on biochemistry and a filter of "historical take," search application 302 then searches within the corpora (e.g., information corpus 326) and locates various uploaded tasks from projects that have had a "historical take" (or its synonym) and NLP system 312 generates a new task for the current project based on the information. Accordingly, NLP system 312 returns to the user both original and newly generated tasks based on the input and filters. Thus, for example, a user could analyze the results and compare the results to previous undertakings.

In an embodiment, data sources include one or more of: one or more data warehouses, one or more information corpora (e.g., information corpus 326), one or more data models, one or more multimedia files, and one or more document repositories. Information corpus 326 enables data storage and retrieval. In an embodiment, information corpus 326 is a storage mechanism that houses a standardized, consistent, clean, and integrated form of potential target documents (e.g., one of a statement of work, one or more documents of understanding, one or more requirements documents, one or more project plans, one or more emails, one or more instant messages, and one or more conversations at meetings, etc.). In an embodiment, information corpus 326 includes various data stores or data structures, such as a static data structure 326A, a social media data structure 326B, and an internet data structure 326C.

In an embodiment, a processor maps each task to a particular class of personality traits in order to identify suitable candidate personality traits. In an embodiment, subject matter experts (SMEs) will map particular classes of personality traits.

In an embodiment, SMEs assign particular personality traits to particular task classes and store that information within information corpus 326 or a specific data structure (for example, 326A, 326B, 326C, or another database). For example, a SME could assign particular tasks into classes such as recruitment, management, performance, finalization, marketing, etc. based on the knowledge and experience of the SME. In an example, if a particular task is selected, NLP system 312 could first determine the class of the task, such as management. In an embodiment, NLP system 312 then scans the "management" ontology class to find candidate personality traits assigned to the same "management" ontology class. Accordingly, NLP system 312 ranked each personality trait based on the relative importance of each personality trait for the task class.

In an embodiment, one or more of the data structures, for example static data structure 326A, social media data structure 326B, and internet data structure 326C, are combined into one data structure. In an embodiment, each of the data structures correspond to different computing devices. For example, for a cloud computing environment, NLP system 312 could derive project information corresponding to static data structure 326A from a first server, task information corresponding to social media data structure 326B from a second server, and personality trait information corresponding to internet data structure 326C from a third server.

In an embodiment, result generator 328 includes a query processor 330, a visualization processor 332, and a feedback handler 334. When information in information corpus 326 or other data source that matches a parsed input is located, query processor 330 executes a technical query. Based on data retrieved by a technical query executed by query processor 330, visualization processor 332 is able to render visualization of the retrieved data, where the visualization represents the newly generated tasks or personality traits and preexisting tasks or personality traits. In an embodiment, visualization processor 332 renders various analytics to represent the tasks and personality traits including, but not limited to, images, charts, tables, dashboards, maps, and the like. In an embodiment, visualization processor 332 presents generated tasks and personality traits to the user.

In an embodiment, feedback handler 334 is a computer module that processes feedback from users on tasks or personality traits generated by result generator 328. In an embodiment, users engage in dialog with NLP system 312 to evaluate the relevance of received tasks or personality traits. Result generator 328 produces a list of tasks or personality traits in response to an input (e.g., project data) by a user. A user (e.g., SME) ranks and scores each task or personality trait according to its relevance to the input. In an embodiment, feedback handler 334 uses the feedback of users on generated answers for future sessions.

Figure 4:
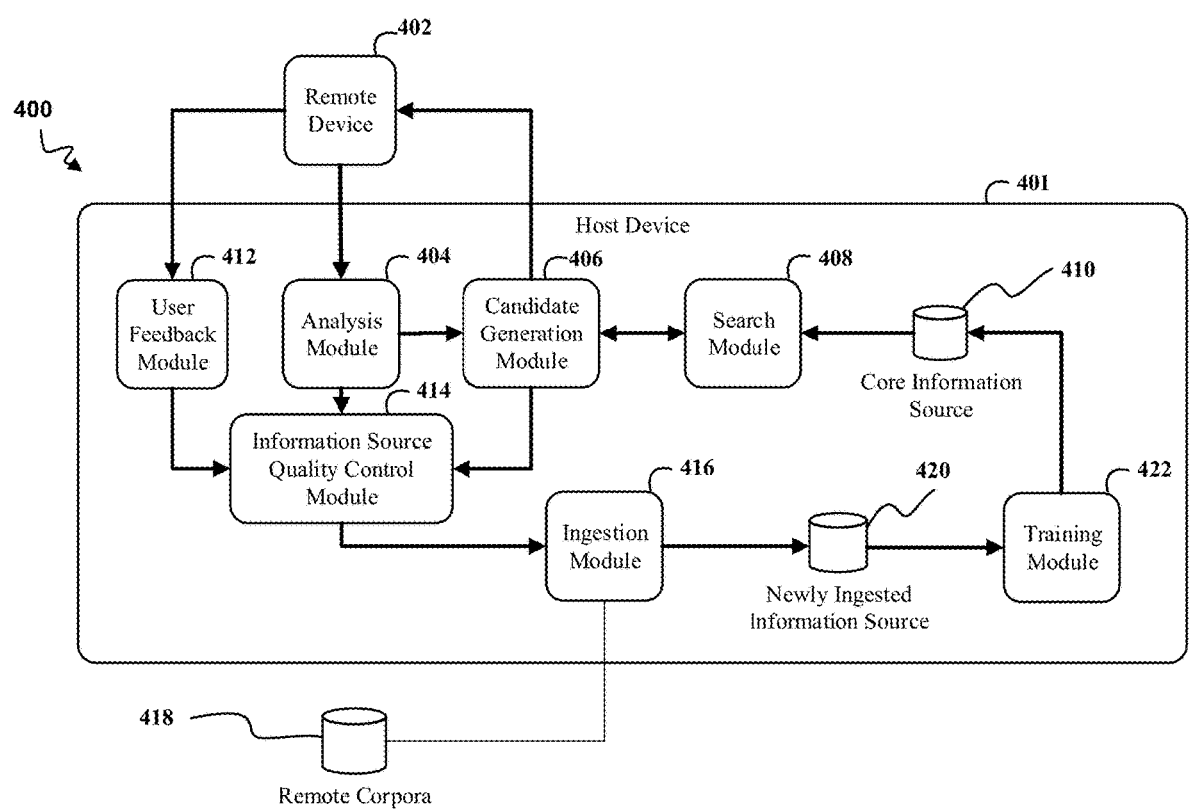
FIG. 4 is a block diagram of an example high level logical architecture of an NLP system, according to embodiments.

In an example, FIG. 4 illustrates a block diagram of an example high level logical architecture of an NLP system 400, according to an embodiment. Aspects of FIG. 4 are directed toward components and modules for use with a cognitive computing system. In an embodiment, host device 222 and remote device 202 embody a host device 401 and a remote device 402 respectively. In an embodiment, an analysis module 404, located on host device 401, receives a natural language input, such as a list of possible tasks, from remote device 402, and can analyze the input to produce information about the input (e.g., provide expanded list of preexisting and newly generated tasks and personality traits). For example, components such as tokenizer 316, POS tagger 318, semantic relationship identifier 320, and syntactic relationship identifier 322 could perform the analyzing. The information produced by analysis module 404 includes, for example, the semantic category of each task input.

Next, in an embodiment, a candidate generation module 406 formulates queries (e.g., task inputs) from the output of analysis module 404 and then pass these queries on to a search module 408 which consults various resources (e.g., previous project data, task data repositories, personality trait repositories, etc.) to retrieve relevant documents. As used herein, documents refer to various types of written, printed, or electronic media (including passages, web-pages, database files, multimedia, etc.) that provide information or evidence. As illustrated in FIG. 4, search module 408 consults a core information source 410. In an embodiment, a core information source refers to any document or group of documents that an NLP system could use to obtain preexisting tasks or personality traits and generate new tasks or personality traits from the list of preexisting tasks and preexisting personality traits. Candidate generation module 406 extracts, from the search results obtained by search module 408, candidate tasks and/or personality traits, which it then scores (e.g., with confidence scores) and ranks according to the comparability, as described in more detail below. Candidate generation module 406 sends a final list of generated tasks, based on a comparison of various confidence scores associated with the generated tasks and personality traits, to remote device 402 for presentation to the user. In an additional embodiment, candidate generation module 406 also sends information about generated tasks, personality traits, and confidence scores to an information source quality control module 414. A user (e.g., a SME) responds, via remote device 402, to generate or alter provided tasks (e.g., input a query that specifies how specific project requirements should be grouped into tasks) through a user feedback module 412. In an embodiment, user feedback module 412 then provides feedback to information source quality control module 414.

In an embodiment, information source quality control module 414 compiles and analyzes information that information source quality control module 414 receives during the course of normal operations of NLP system 400. Information source quality control module 414 could use received information (e.g., information from analysis module 404, candidate generation module 406, and user feedback module 412) to determine whether or not one or more new information sources should be ingested. When the information source quality control module 414 determines that information source quality control module 414 needs a new information source having certain characteristics (e.g., a new project requirement is uploaded), information source quality control module 414 instructs an ingestion module 416 accordingly. Based on these instructions, ingestion module 416 searches one or more remote sources, such as a remote corpora 418, in an attempt to locate one or more suitable new information sources. In an embodiment, once discovered, these new information sources are ingested by ingestion module 416 and become a newly ingested information source 420. The new information sources are in turn analyzed by a training module 422. In an embodiment, training analysis takes the form of obtaining training candidate tasks and personality traits from user inputs using newly ingested information source 420 and then reviewing the quality of generated candidate tasks and personality traits. In an embodiment, NLP system 400 uses training candidate tasks and personality traits for either (1) reviewing or determining the quality or characteristics of an information source used to identify training candidate tasks and personality traits, (2) creating or refining machine learning models and routing paths usable by NLP system 400, or both. In an embodiment, once newly injected information source 420 meets a threshold level of confidence, it is combined with core information source 410 and used to generate tasks and personality traits based on input from users.

In an embodiment, NLP system 400 uses the various components and modules of the exemplary high level logical architecture for an NLP system described above to implement various aspects of the present disclosure. For example, NLP system 400 could use analysis module 404 to receive a set of inputs from a user, such as a list of requirements. In an embodiment, NLP system 400 could use candidate generation module 406 and search module 408 together to perform searches of core information source 410, generate new tasks and personality traits, calculate confidence scores associated with the new tasks and personality traits, and provide the generated tasks and personality traits to one or more users. In an embodiment, NLP system 400 could use information source quality control module 414 to analyze confidence scores and determine whether or not the confidence scores fail to meet one or more confidence criteria. Further, in an embodiment, NLP system 400 could use ingestion module 416 to ingest new information sources (in response to an indication from information source quality control module 414 that a confidence criteria has not been satisfied).

Analyzing Project Data and Creating Tasks

In an embodiment, the analyzing of project data includes capturing project task requirements through cognitive analysis. The capture of information combines both formal project planning documents with informal conversational-style inputs to build up a full understanding of project task requirements. For example, the sources could include formal project task requirement documents such as; statements of work, documents of understanding, requirements documents, and project plans. The sources could also include informal project task requirement inputs such as emails, instant messages, and conversations at meetings. In one embodiment, an NLP module analyzes the mixture of formal and informal sources which use cognitive language techniques to draw out specific requirements around each task.

Cognitive Personality Analysis of Identified Task Requirement

In an embodiment, a cognitive analysis system analyzes the one or more tasks identified to determine personality traits linked to completing each task requirement. In one embodiment, a cognitive analysis system uses a big five personality model to rate each requirement against five primary dimensions. The big five primary dimensions are agreeableness, conscientiousness, extraversion, emotional range, and openness. Agreeableness is a tendency to be compassionate and cooperative toward others. Conscientiousness is a tendency to act in an organized or thoughtful way. Extraversion is a tendency to seek stimulation in the company of others. Emotional range is the extent to which emotions are sensitive to the individual's environment. Openness is the extent to which a person is open to experiencing a variety of activities. The cognitive analysis system subdivides each primary dimension into facets. For example, the Agreeableness primary dimension has the following facets: altruism, cooperation, modesty, morality, sympathy, and trust.

Figure 5A:
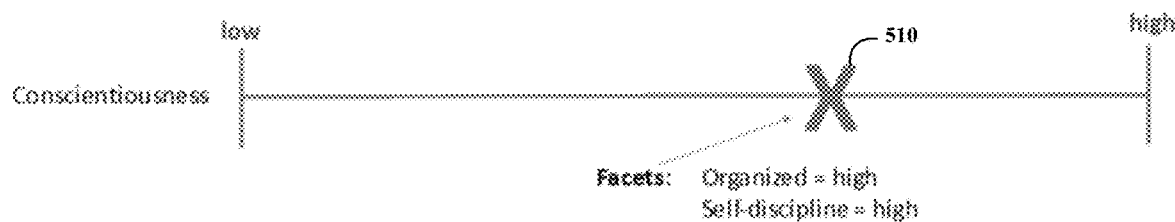
FIG. 5A depicts a diagram of a task requirement and an associated personality attribute of the task, in accordance with an exemplary embodiment of the present invention.
Figure 5B:
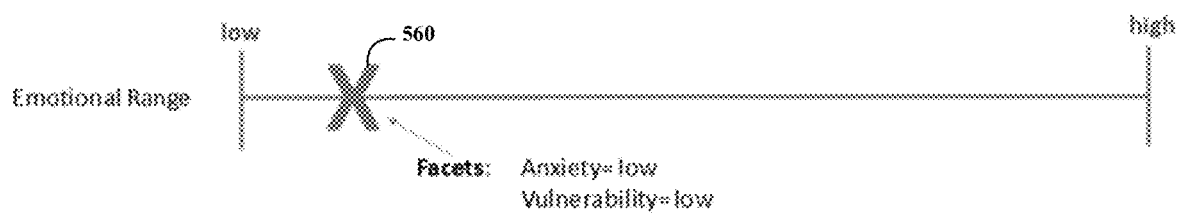
FIG. 5B depicts a diagram of a task requirement and an associated personality attribute of the task, in accordance with an exemplary embodiment of the present invention.

In an embodiment, the cognitive analysis system analyzes each task to identify and rate the most prominent personality dimensions and facets needed to complete the task. Referring to FIG. 5A and FIG. 5B, for example, a first requirement 500 for a task might be: document all command line options and a second requirement 550 for the task might be: complete the task by next week. In an example, a cognitive system analyzes requirements to determine the most prominent personality dimensions and facets linked to completing first requirement 500 and second requirement 550. In an example, first requirement 500 indicates a highly-structured task to carefully document all command line options. First requirement has a high rating 510 in the "organized" and "self-discipline" facets of a conscientiousness dimension. The "organized" and "self-discipline" facets of the conscientiousness dimension are the most prominent personality traits required to complete first requirement 500 of the task. Conversely, second requirement 550 indicates a high stress task, requiring a personality that responds well under pressure. A low rating 560 in the "anxiety" and "vulnerability" facets of the emotional range dimension is important for second requirement 550 of the task.

Figure 6:
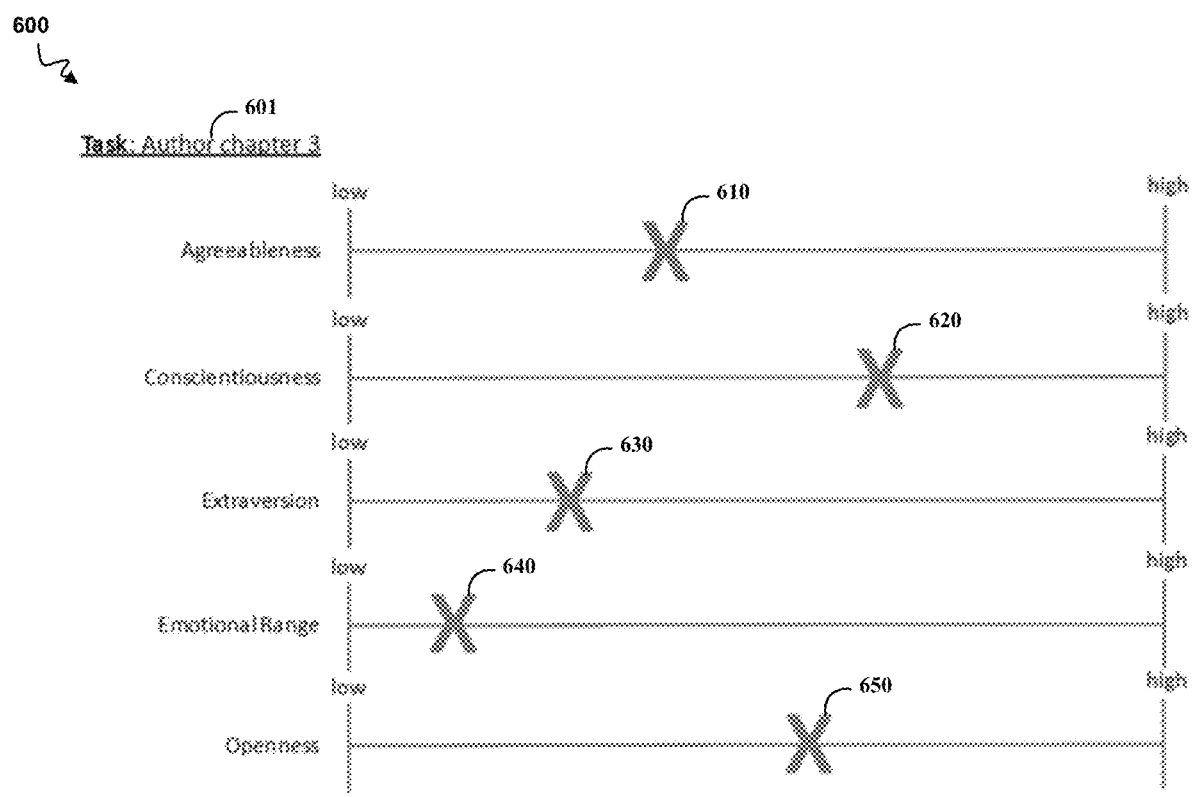
FIG. 6 depicts a diagram of a task profile and associated personality traits of the task, in accordance with an exemplary embodiment of the present invention.

In one embodiment, once a cognitive system rates each identified requirement, the cognitive system merges a full list of personality dimensions and facets to create one or more task profiles for one or more tasks. FIG. 6 shows an example profile 600 depicting the overall picture of the personality traits required to complete an example task 601. The cognitive system groups personality traits for all requirements that make up a given task together. For example, the cognitive system could group personality trait ratings of an agreeableness 610, a conscientiousness 620, an extraversion 630, an emotional range 640, and an openness 650 together to create profile 600. In an embodiment, the cognitive system merges identified prominent personality dimensions and facets for the requirements to create an overall picture of the personality traits required for each of the personality dimensions. In an embodiment, the cognitive system uses weightings such that a particularly important personality attribute for a requirement results in a higher weighting when assigning a score to each personality dimension. Likewise, the cognitive system uses weightings such that a less than particularly important personality attribute for a requirement results in a lower weighting when assigning a score to each personality dimension. For example, if the cognitive system weights a personality trait highly for a requirement, the cognitive system may select a team member with a high rating in that personality trait even if other candidates have higher ratings in personality traits with low ratings for the requirement. In an embodiment, the cognitive system will not weigh personality attributes and the cognitive system will consider each as important as any other personality attributes linked to a task.

Cognitive Personality Analysis of Team Members

In an embodiment, a cognitive personality insights service is applied to each team member to create a personality profile. For example, the cognitive personality insights service takes unstructured input created by a given team member such as: social network postings, resume, email messages, instant messages, and text messages. In an embodiment, the cognitive personality insight service generates a personality profile for each team member with low-to-high ratings for that person's personality traits.

Comparison and Recommended Assignment of Team Members to Given Tasks

In an embodiment, an NLP system compares each task profile to each team member's personality profile (team member profile) to determine which team member is best suited to complete the given task. In an embodiment, the method includes receiving, by the one or more processors, one or more team member profiles, where one or more of the one or more team member profiles includes a list of one or more team member personality traits; and comparing, by the one or more processors, the one or more current task profiles to the one or more team member profiles, and returning, to an electronic device, a result of the comparing of the one or more current task profile to the one or more team member profiles. In an embodiment, the method includes receiving, by the one or more processors, one or more team member profiles, wherein one or more of the one or more team member profiles comprises a list of one or more team member personality traits; and comparing, by the one or more processors, the one or more current task profiles to the one or more team member profiles. For example, the NLP system could use a skill assessment for each given task to initially select the team members capable of performing a task, and then the NLP system could use a personality assessment to rank the team members selected. In an embodiment, the NLP system performs the skill assessment matching in any way that determines a subset of team members who possess the skills for a given task. In an example, the skill assessment could be from self-nomination, an assessment survey, or some other form of skills analysis. In a further example, for self-nomination, each team member could report if he or she has the skills to write a chapter of a book and team members that do could make up a subset of team members. In an embodiment, after the NLP system selects a subset of the team members with the appropriate skills, the computer system compares the personality of the subset of team members and compares it to the personality for the task. With the field of team members reduced to a subset of team members, the computer system compares the personality assessment of the subset of team members with the required personality traits required to complete a task. In an embodiment, the method includes calculating, by the one or more processors, a personal suitability score for one or more of the one or more team member profiles based on the comparison of the one or more current task profiles to the one or more team member profiles, and displaying, via an electronic device, the personal suitability score for each of the one or more team member profiles based on the calculating. In an embodiment, the method includes calculating, by the one or more processors, a personal suitability score for one or more of the one or more team member profiles based on the comparison of the one or more current task profiles to the one or more team member profiles. In a further embodiment, the calculating comprises rating the degree of correlation between one or more of the one or more team member profiles and each of the one or more current task profiles.

In an embodiment, the NLP system determines a personality suitability score from the comparison, which rates how closely personality traits of each team member of the subset of team members match with the personality traits required to complete the task. For example, the personality of a team member with a personality attribute that correlates closely to the task could have a personality suitability score of 78%, whereas the personality of a team member that does not correlate closely the task could have a personality score of 38%. In an embodiment, the personality score will demonstrate which suitably-qualified team member is most compatible with one of the one or more tasks.

Computer System

Figure 7:
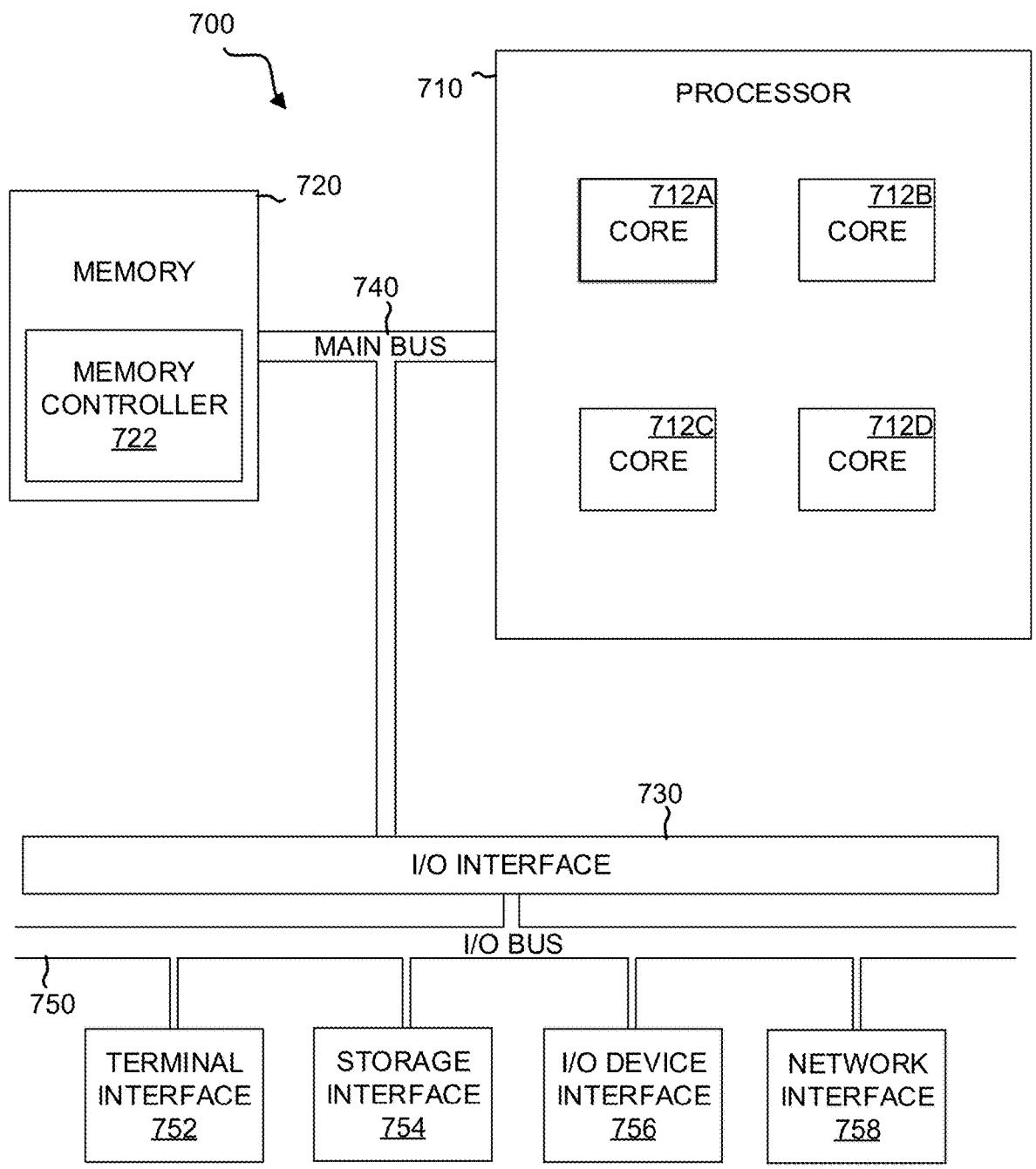
FIG. 7 depicts the representative major components of an example computer system that may be used, in accordance with an exemplary embodiment of the present invention.

In an exemplary embodiment, the computer system is a computer system 700 as shown in FIG. 7. Computer system 700 is only one example of a computer system and is not intended to suggest any limitation as to the scope of use or functionality of embodiments of the present invention. Regardless, computer system 700 is capable of being implemented to perform and/or performing any of the functionality/operations of the present invention.

In an embodiment, FIG. 7 depicts the representative major components of example computer system 700. It is appreciated that individual components could vary in complexity, number, type, and\or configuration. The particular examples disclosed are for example purposes only and are not necessarily the only such variations. Computer system 700 could include a processor 710, a memory 720, an input/output interface (herein I/O or I/O interface) 730, and a main bus 740. Main bus 740 could provide communication pathways for the other components of computer system 700. In an embodiment, main bus 740 connects to other components such as a specialized digital signal processor (not depicted). In an embodiment, the computer system is computer system 700 as shown in FIG. 7, that executes a managing telephone interactions script or computer software application that carries out the operations of at least a method 100.

In an embodiment, processor 710 of computer system 700 includes one or more cores 712A, 712B, 712C, 712D (collectively cores 712). In an embodiment, processor 710 additionally includes one or more memory buffers or caches (not depicted) that provide temporary storage of instructions and data for cores 712. Cores 712 perform instructions on input provided from the caches or from memory 720 and output the result to caches or the memory. In an embodiment, cores 712 could include one or more circuits configured to perform one or more methods consistent with embodiments of the present invention. In an embodiment, computer system 700 contains multiple processors 710. In an embodiment, computer system 700 is single processor 710 with singular core 712.

In an embodiment, memory 720 of computer system 700 includes a memory controller 722. In an embodiment, memory 720 includes a random-access semiconductor memory, a storage device, or a storage medium (either volatile or non-volatile) for storing data and programs. In an embodiment, the memory could be in the form of modules (e.g., dual in-line memory modules). Memory controller 722 could communicate with processor 710, facilitating storage and retrieval of information in memory 720. In an embodiment, memory controller 722 communicates with I/O interface 730, facilitating storage and retrieval of input or output in the memory 720.

In an embodiment, I/O interface 730 comprises an I/O bus 750, a terminal interface 752, a storage interface 754, an I/O device interface 756, and a network interface 758. I/O interface 730 could connect main bus 740 to I/O bus 750. I/O interface 730 could direct instructions and data from processor 710 and memory 720 to the various interfaces of I/O bus 750. I/O interface 730 could also direct instructions and data from the various interfaces of I/O bus 750 to processor 710 and memory 720. The various interfaces could include terminal interface 752, storage interface 754, I/O device interface 756, and network interface 758. In an example, the various interfaces could include a subset of the aforementioned interfaces (e.g., an embedded computer system in an industrial application could not include terminal interface 752 and storage interface 754).

In an example, logic modules throughout computer system 700—including but not limited to memory 720, processor 710, and I/O interface 730—could communicate failures and changes to one or more components to a hypervisor or operating system (not depicted). The hypervisor or the operating system could allocate the various resources available in computer system 700 and track the location of data in memory 720 and of processes assigned to various cores 712. In embodiments that combine or rearrange elements, aspects and capabilities of the logic modules could be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In an embodiment, electronic circuitry includes programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
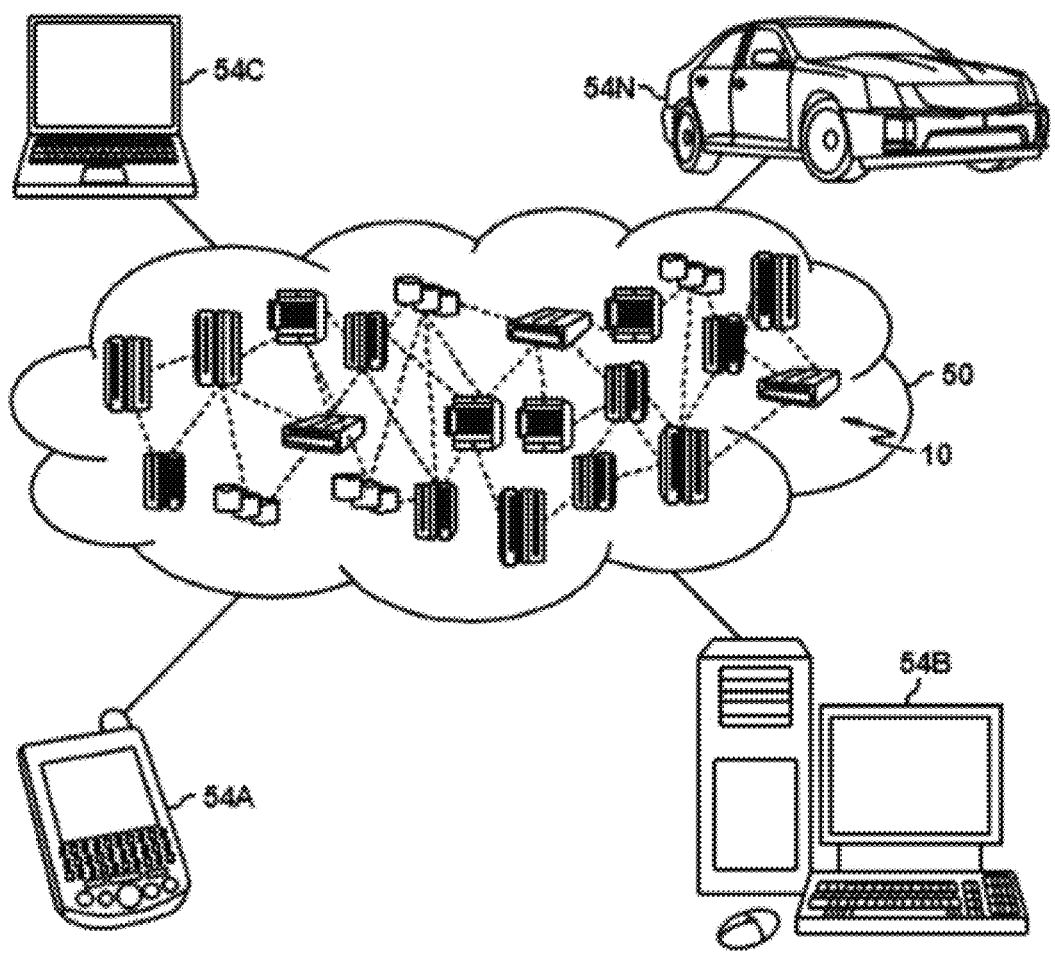
FIG. 8 depicts a cloud computing environment, in accordance with an exemplary embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
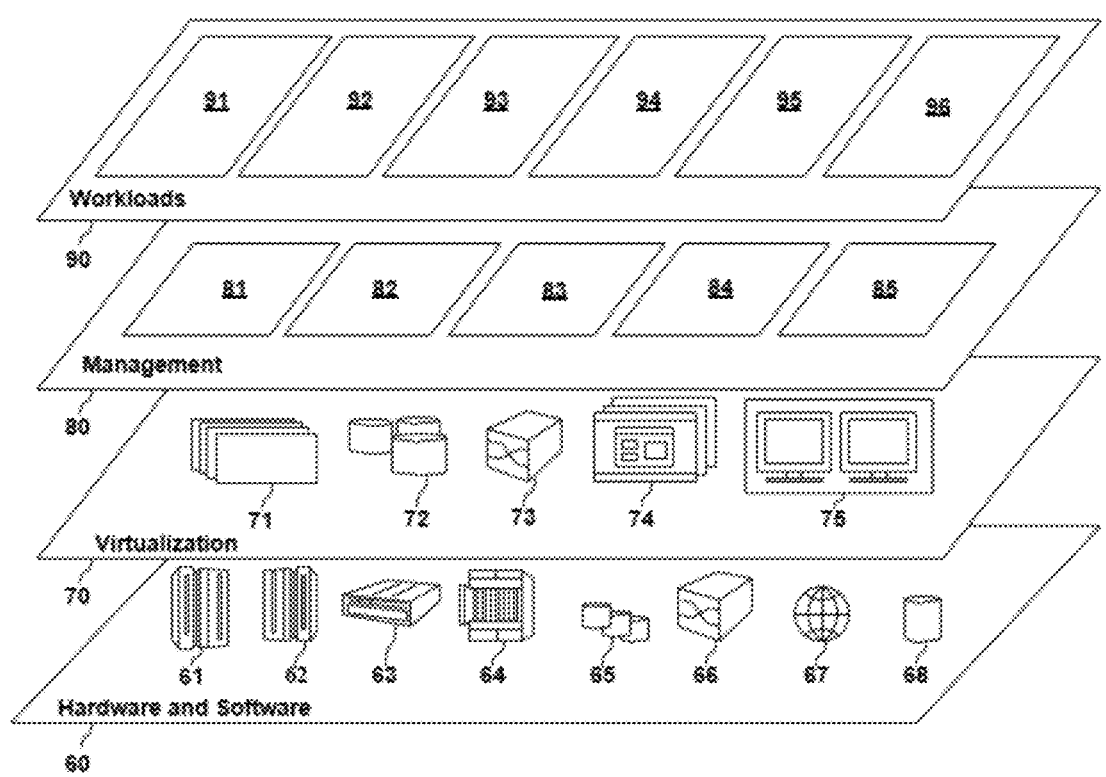
FIG. 9 depicts abstraction model layers, in accordance with an exemplary embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In an embodiment, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and task determination and personality associating 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
    receiving a historical set of data associated with one or more preexisting projects from a static data structure, the historical set of data including personality traits linked to a completion of tasks;
    grouping particular personality traits together for a completed task;
    training a computer system using the grouped particular personality traits for the completed task by creating a machine learning model and a routing path linking the grouped particular personality traits to the completed task to identify task and associated personality traits from social media data;
    receiving a task data from a social media data structure;
    determining that a quality of the task data from the social media data structure exceeds a threshold quality;
    combining, based on the determining, the static data structure and the social media data structure into a unified data structure to identify critical personality traits for a given task;
    performing at least one iteration of refining the machine learning model and the routing path based on the unified data structure to identify critical personality traits for a given task, wherein each iteration of the refining changes the machine learning model;
    receiving a query from a user for search terms in a graphical user interface (GUI) via a command line prompt in a client application through a hypertext transfer protocol, wherein the user is authenticated to a natural language processing (NPL) system via a session manager;
    in response to receiving a set of data for a current project and the query, performing syntactic analysis on that set of data for the current project to extract one or more task terms from the set of data for the current project using a natural language processing system, wherein the syntactic analysis includes converting the human voice into the written word;

generating, by one or more processors using the refined machine learning model, a set of one or more current tasks for the current project based on the routing path and the extracting;

analyzing the set of data using the refined machine learning model;

generating, by the one or more processors based on the analyzing, one or more personality trait weightings for a current task in the set of one or more current tasks,
  wherein a particular personality trait weighting of a particular personality trait is based on an importance of the particular personality trait for the current task;

displaying the one or more personality trait weightings on the GUI;

assigning one or more personality trait scores for each particular personality trait for the current task based on the one or more weightings generated for each particular personality trait;

comparing the one or more personality trait scores to one or more team member profiles;

identifying a candidate for a first task in the one or more current tasks based on the comparison; and displaying the candidate on the GUI.

2. The method of claim 1 wherein the machine learning includes identifying patterns and associations between the one or more preexisting projects and one or more preexisting tasks of the one or more preexisting projects.

3. The method of claim 1 further comprising ranking, by the one or more processors, one or more personality traits based on the one or more personality trait weightings.

4. The method of claim 1 further comprising:
receiving, by the one or more processors, the one or more team member profiles,
  wherein the one or more team member profiles comprises a list of one or more team member personality traits.

5. The method of claim 4 further comprising:
calculating, by the one or more processors, a personal suitability score for one or more of the one or more team member profiles based on the comparison of the one or more personality trait scores to the one or more team member profiles.

6. The method of claim 5 wherein the calculating comprises rating a degree of correlation between one or more of the one or more team member profiles and one or more of the one or more personality trait weightings for the current task.

7. The method of claim 1 wherein the set of data for the current project describes at least one of a statement of work, one or more documents of understanding, one or more requirements documents, one or more project plans, one or more emails, one or more instant messages, and one or more conversations.

8. A system comprising:
a processor; and
a memory in communication with the processor, the memory containing program instructions that, when executed by the processor, are configured to cause the processor to perform a method, the method comprising:
receiving a historical set of data associated with one or more preexisting projects from a static data structure, the historical set of data including personality traits linked to a completion of tasks;
grouping particular personality traits together for a completed task;
training a computer system using the grouped particular personality traits for the completed task by creating a machine learning model and a routing path linking the grouped particular personality traits to the completed task to identify task and associated personality traits from social media data;
receiving a task data from a social media data structure;
determining that a quality of the task data from the social media data structure exceeds a threshold quality;
combining, based on the determining, the static data structure and the social media data structure into a unified data structure to identify critical personality traits for a given task;
performing at least one iteration of refining the machine learning model and the routing path based on the unified data structure to identify critical personality traits for a given task, wherein each iteration of the refining changes the machine learning model;
receiving a query from a user for search terms in a graphical user interface (GUI) via a command line prompt in a client application through a hypertext transfer protocol, wherein the user is authenticated to a natural language processing (NPL) system via a session manager;
in response to receiving a set of data for a current project and the query, performing syntactic analysis on the set of data for the current project to extract one or more task terms from the set of data for the current project using a natural language processing system, wherein the syntactic analysis includes converting the human voice into the written word;
generating, using the refined machine learning models, a set of one or more current tasks for the current project based on at least the routing path and the extracting;
analyzing the set of data using the refined machine learning models;
generating, based on the analyzing, one or more personality trait weightings for a current task in the set of one or more current tasks,
  wherein a particular personality trait weighting of a particular personality trait is based on an importance of the particular personality trait for the current task;
displaying the one or more personality trait weightings on the GUI;
assigning one or more personality trait scores for each particular personality trait for the current task based on the one or more weightings generated for each particular personality trait;
comparing the one or more personality trait scores to one or more team member profiles;
identifying a candidate for a first task in the one or more current tasks based on the comparison; and
displaying the candidate on the GUI.

9. The computer system of claim 8 wherein the machine learning includes identifying patterns and associations between the one or more preexisting projects and one or more preexisting tasks of the one or more preexisting projects.

10. The computer system of claim 8 further comprising ranking, by the processor, one or more personality traits based on the one or more personality trait weightings.

11. The computer system of claim 8 further comprising:
receiving, by the processor, the one or more team member profiles,
  wherein the one or more of the one or more team member profiles comprises a list of one or more team member personality traits.

12. The computer system of claim 11 further comprising: calculating, by the processor, a personal suitability score for one or more of the one or more team member profiles based on the comparison of the one or more personality trait scores to the one or more team member profiles.

13. A computer program product comprising a computer readable storage medium having program instructions embodied therewith, wherein the computer readable storage medium is not a transitory signal per se, the program instructions executable by a computer processing circuit to cause the circuit to perform a method comprising:
 receiving a historical set of data associated with one or more preexisting projects, the historical set of data including personality traits lined to a completion of tasks;
 grouping particular personality traits together for a completed task;
 training a computer system using the grouped particular personality traits for the completed task by creating a machine learning model and a routing path linking the grouped particular personality traits to the completed task to identify task and associated personality traits from social media data;
 receiving a task data from a social media data structure;
 determining that a quality of the task data from the social media data structure exceeds a threshold quality;
 combining, based on the determining, a static data structure and the social media data structure into a unified data structure to identify critical personality traits for a given task;
 performing at least one iteration of refining the machine learning model and the routing path based on the unified data structure to identify critical personality traits for a given task, wherein each iteration of the refining changes the machine learning model;
 receiving a query from a user for search terms in a graphical user interface (GUI) via a command line prompt in a client application through a hypertext transfer protocol, wherein the user is authenticated to a natural language processing (NLP) system via a session manager;
 in response to receiving a set of data for a current project and the query, performing syntactic analysis on the set of data for the current project to extract one or more task terms from the set of data for the current project using a natural language processing system, wherein the syntactic analysis includes converting the human voice into the written word;
 generating, by one or more processors using the refined machine learning model, a set of one or more current tasks for the current project based on the routing path and the extracting;
 analyzing the set of data using the refined machine learning model;
 generating, by the one or more processors based on the analyzing, one or more personality trait weightings for a current task in the set of one or more current tasks, wherein a particular personality trait weighting of a particular personality trait is based on an importance of the particular personality trait for the current task;
 displaying the one or more personality trait weightings on the GUI;
 assigning one or more personality trait scores for each particular personality trait for the current task based on the one or more weightings generated for each particular personality trait;
 comparing the one or more personality trait scores to one or more team member profiles;
 identifying a candidate for a first task in the one or more current tasks based on the comparison; and
 displaying the candidate on the GUI.

14. The computer program product of claim 13, wherein the machine learning includes identifying patterns and associations between the one or more preexisting projects and one or more preexisting tasks of the one or more preexisting projects.

15. The computer program product of claim 13 further comprising ranking, by the one or more personality traits based on the one or more personality trait weightings.

16. The computer program product of claim 13 further comprising:
 receiving, by the one or more processors, the one or more team member profiles,
  wherein the one or more team member profiles comprises a list of one or more team member personality traits.

17. The computer program product of claim 16 further comprising:
calculating, by the one or more processors, a personal suitability score for one or more of the one or more team member profiles based on the comparison of the one or more personality trait scores to the one or more team member profiles.

* * * * *